(12) United States Patent
Goto

(10) Patent No.: US 8,488,858 B2
(45) Date of Patent: Jul. 16, 2013

(54) MEDIAN PLANE DETERMINATION APPARATUS AND MAGNETIC RESONANCE IMAGING SYSTEM

(75) Inventor: Takao Goto, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 789 days.

(21) Appl. No.: 12/683,376

(22) Filed: Jan. 6, 2010

(65) Prior Publication Data
US 2010/0172566 A1    Jul. 8, 2010

(30) Foreign Application Priority Data
Jan. 7, 2009 (JP) .................................. 2009-001478

(51) Int. Cl.
*G06K 9/00* (2006.01)
(52) U.S. Cl.
USPC .......................................... 382/131; 382/128

(58) Field of Classification Search
USPC .................................................. 382/128, 131
See application file for complete search history.

(56) References Cited

U.S. PATENT DOCUMENTS

| | | | |
|---|---|---|---|
| 4,936,311 A | 6/1990 | Oe | |
| 5,155,435 A | 10/1992 | Kaufman et al. | |
| 5,427,100 A | 6/1995 | Higashi et al. | |
| 5,699,799 A | 12/1997 | Xu et al. | |
| 7,548,638 B2 | 6/2009 | Graessner | |
| 2006/0233430 A1* | 10/2006 | Kimura | 382/128 |
| 2007/0276219 A1* | 11/2007 | K.N. et al. | 600/410 |

FOREIGN PATENT DOCUMENTS

JP    05-212013    8/1993

* cited by examiner

*Primary Examiner* — Hoon Song
(74) *Attorney, Agent, or Firm* — Armstrong Teasdale, LLP

(57) ABSTRACT

A median plane determination apparatus determines a median plane based on volume data of a brain of a subject. The median plane is determined based on voxel values of voxels which intersect with a reference surface cutting across the brain.

13 Claims, 22 Drawing Sheets

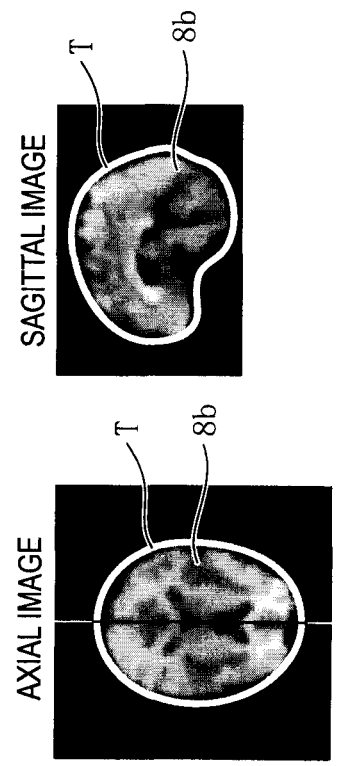
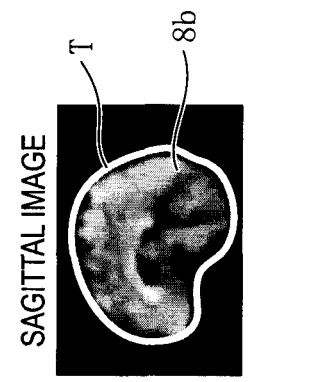
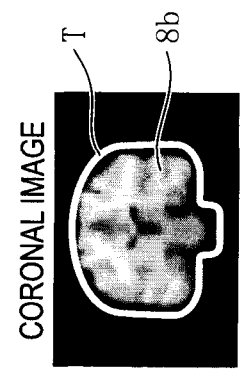
FIG. 8A
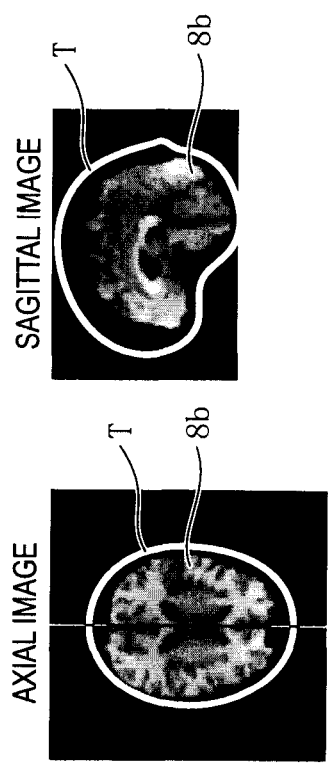
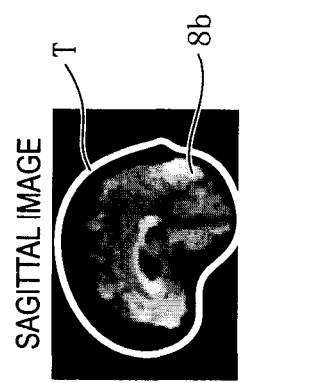
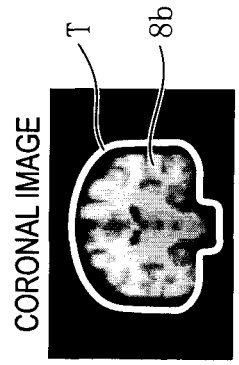
FIG. 8B

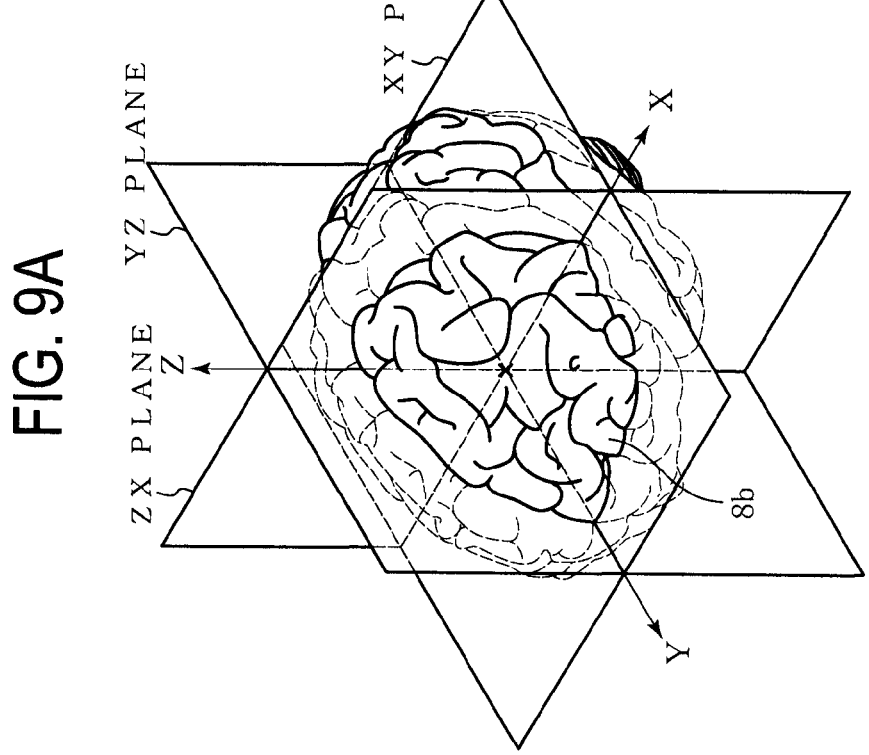
FIG. 9A
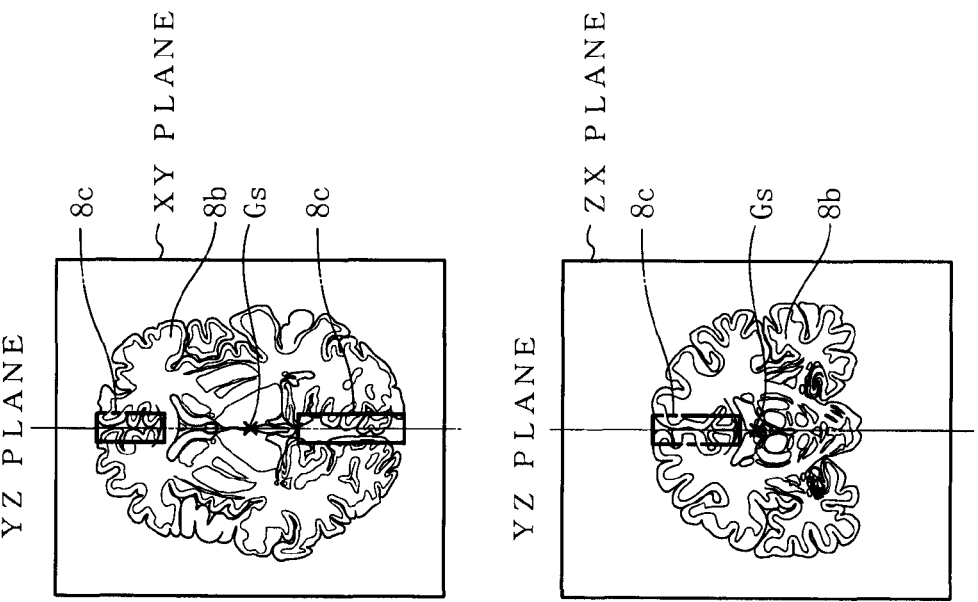
FIG. 9B
FIG. 9C

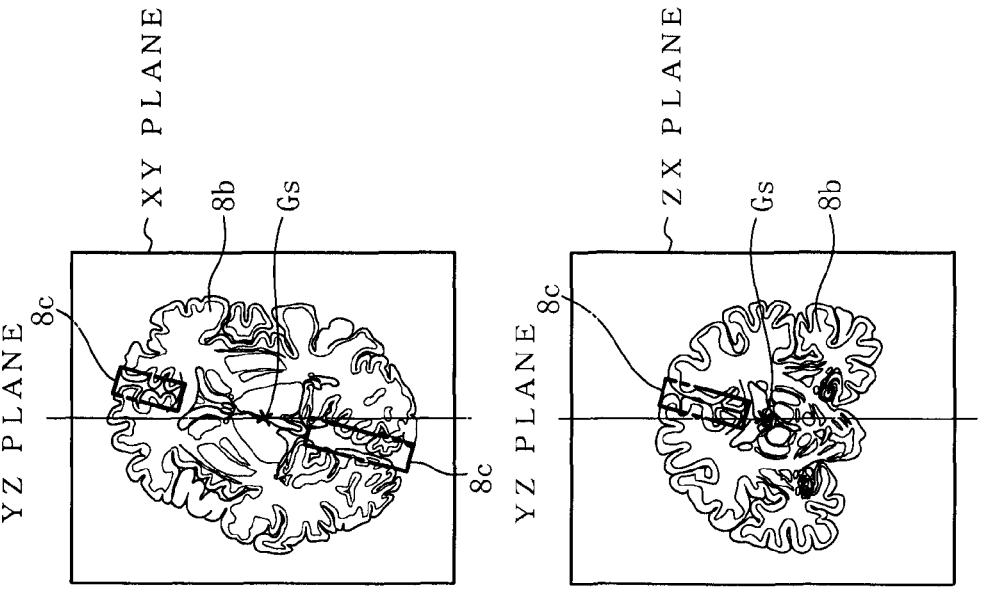
FIG. 10B
FIG. 10C
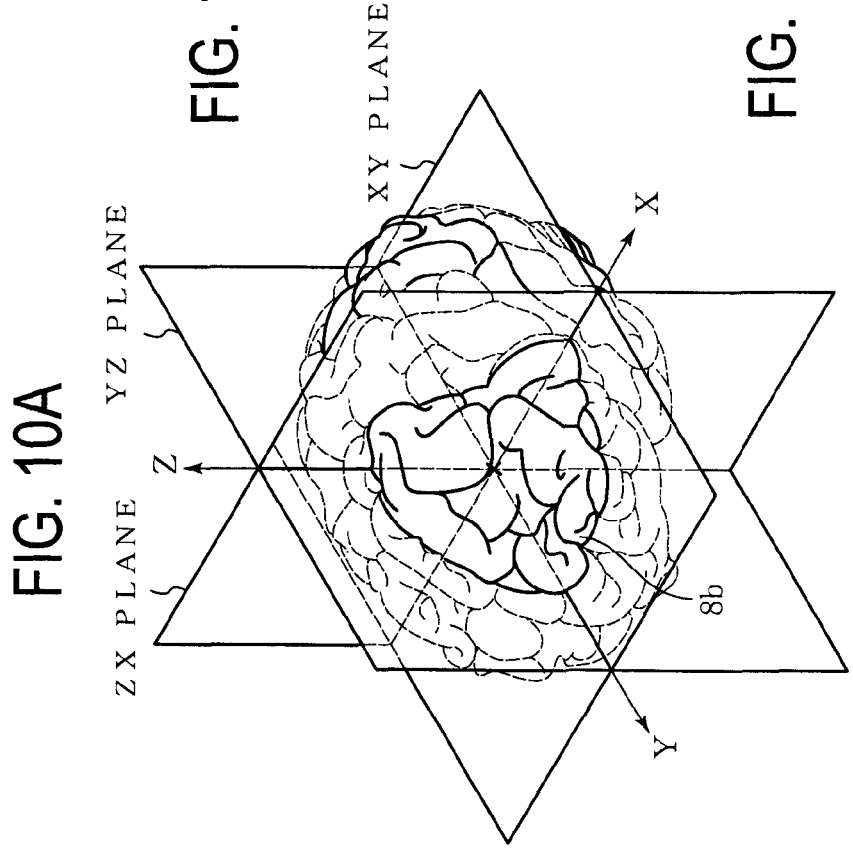
FIG. 10A

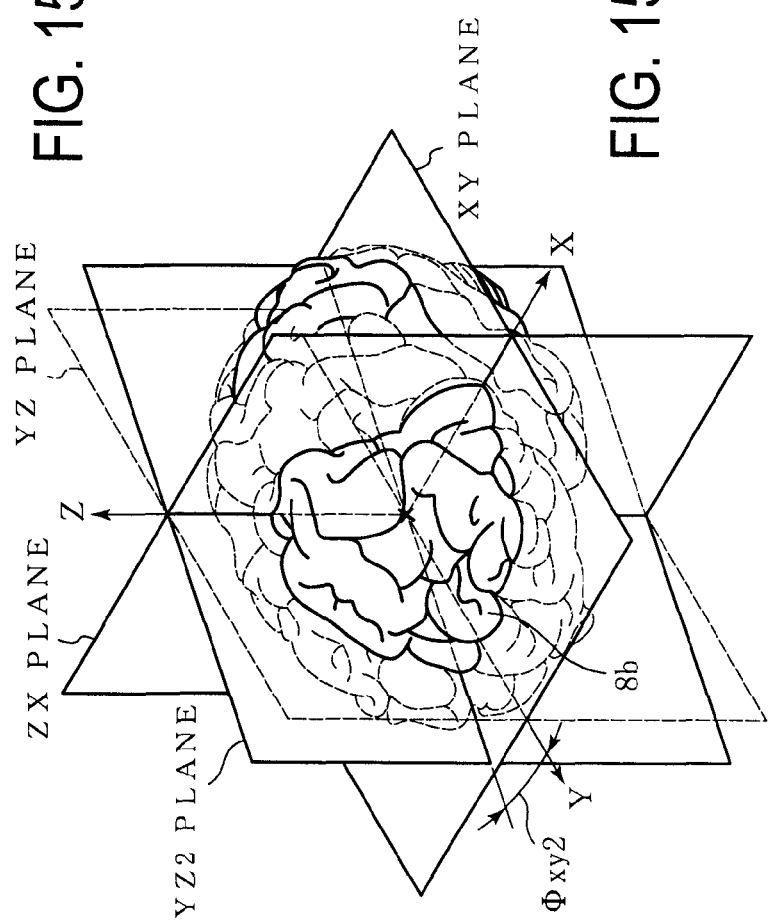
FIG. 15A
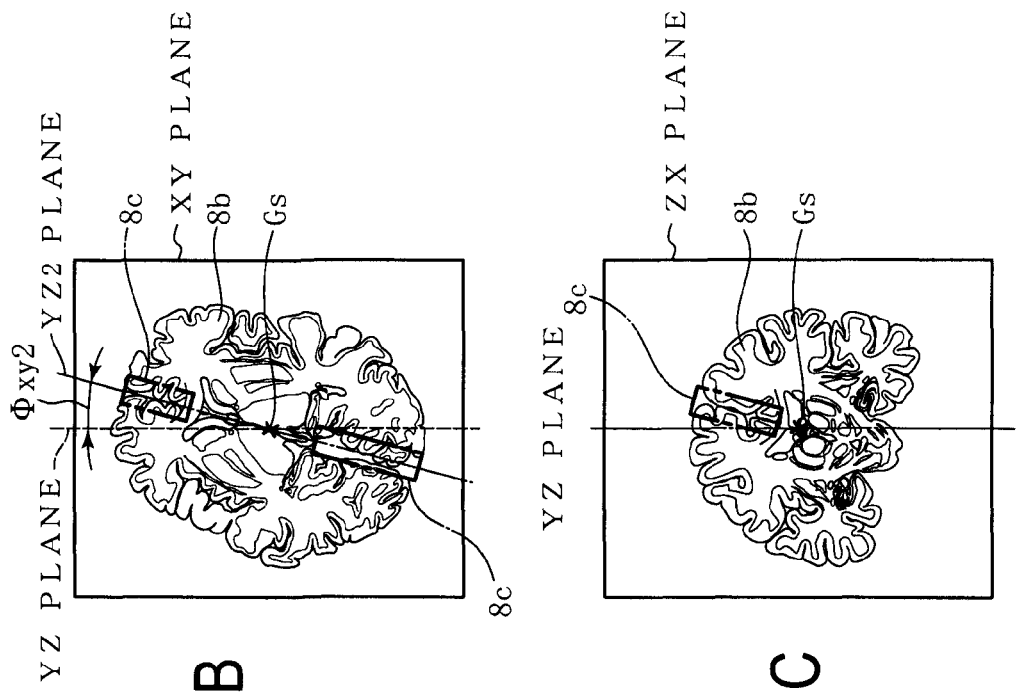
FIG. 15B
FIG. 15C

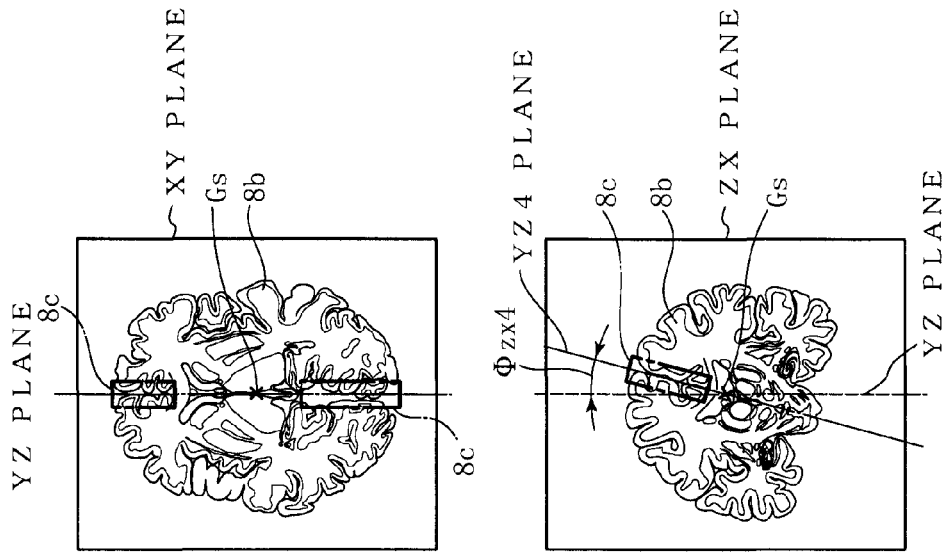
FIG. 21B
FIG. 21C
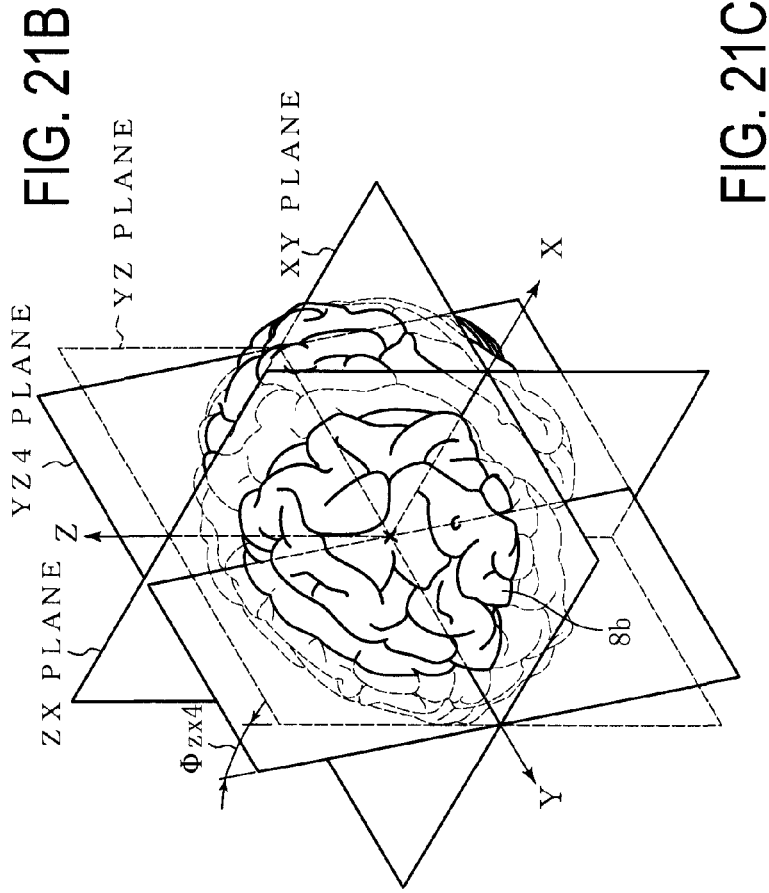
FIG. 21A

MEDIAN PLANE DETERMINATION APPARATUS AND MAGNETIC RESONANCE IMAGING SYSTEM

CROSS REFERENCE TO RELATED APPLICATIONS

This application claims the benefit of Japanese Patent Application No. 2009-001478 filed Jan. 7, 2009, which is hereby incorporated by reference in its entirety.

BACKGROUND OF THE INVENTION

The embodiments described herein relate to a median plane determination apparatus for determining a median plane, based on volume data of a brain of a subject, and a magnetic resonance imaging system.

When slices are set to a brain of a subject, the slices might be set on the basis of a median plane. In this case, it is important that since the position of each slice changes depending on the position of the median plane, the position of the median plane is decided with possible satisfactory accuracy. The position of the median plane is generally determined on the basis of a longitudinal cerebral fissure. Thus, in order to determine the position of the median plane with possible satisfactory accuracy, there is a need to detect the position of the longitudinal cerebral fissure as accurately as possible. As a method for detecting the position of the longitudinal cerebral fissure, it is considered that a median line is utilized (refer to Japanese Unexamined Patent Publication No. Hei 5 (1993)-212013).

In the method described above, a longitudinal cerebral fissure lying in a tomographic image is tracked and a median line is determined based on its tracked line. It is thus known where the longitudinal cerebral fissure cuts across within the tomographic image. Since, however, the longitudinal cerebral fissure extends two-dimensionally, it is unknown where the longitudinal cerebral fissure cuts across within another tomographic image, so that the position of the longitudinal cerebral fissure cannot be determined with high accuracy. A problem thus arises in that the median plane cannot be determined with high accuracy even if the method described above is used.

BRIEF DESCRIPTION OF THE INVENTION

Embodiments of the invention provide a median plane determination apparatus for determining a median plane, based on volume data of a brain of a subject, wherein the median plane is determined based on voxel values of voxels that intersect with a reference plane cutting across the brain.

In some embodiments, a median plane is determined based on voxel values of voxels that interest a reference plane cutting across a brain. Since the position of a longitudinal cerebral fissure can be detected with satisfactory accuracy by using the reference plane rather than a median line, the median plane can be decided with satisfactory accuracy.

BRIEF DESCRIPTION OF THE DRAWINGS

FIG. 8A is a diagram showing the manner of three angle (rotation) parameters rx, ry and rz and three scaling parameters sx, sy and sz, prior to the angle parameters and the scaling parameters being brought into optimization, and FIG. 8B is a diagram showing the manner of the three angle (rotation) parameters rx, ry and rz and the three scaling parameters sx, sy and sz after the angle parameters and the scaling parameters are optimized.

FIGS. 9A, 9B, and 9C are diagrams illustrating one example of positions in an XYZ space, of a longitudinal cerebral fissure 8c of the sample brain 8b subsequent to the execution of a matching process.

FIGS. 10A, 10B, and 10C are diagrams showing one example where the longitudinal cerebral fissure 8c of the sample brain 8b is shifted from a YZ plane.

FIGS. 15A, 15B, and 15C are diagrams after the YZ plane has been rotated by a rotational angle Φxy2 about the Z axis.

FIGS. 21A, 21B, and 21C are diagrams after the YZ plane has been rotated by a rotational angle Φzx4 about the Y axis.

DETAILED DESCRIPTION OF THE INVENTION

Although embodiments of the invention will be explained below, the invention is not limited to the embodiments described herein.

Figure 1:
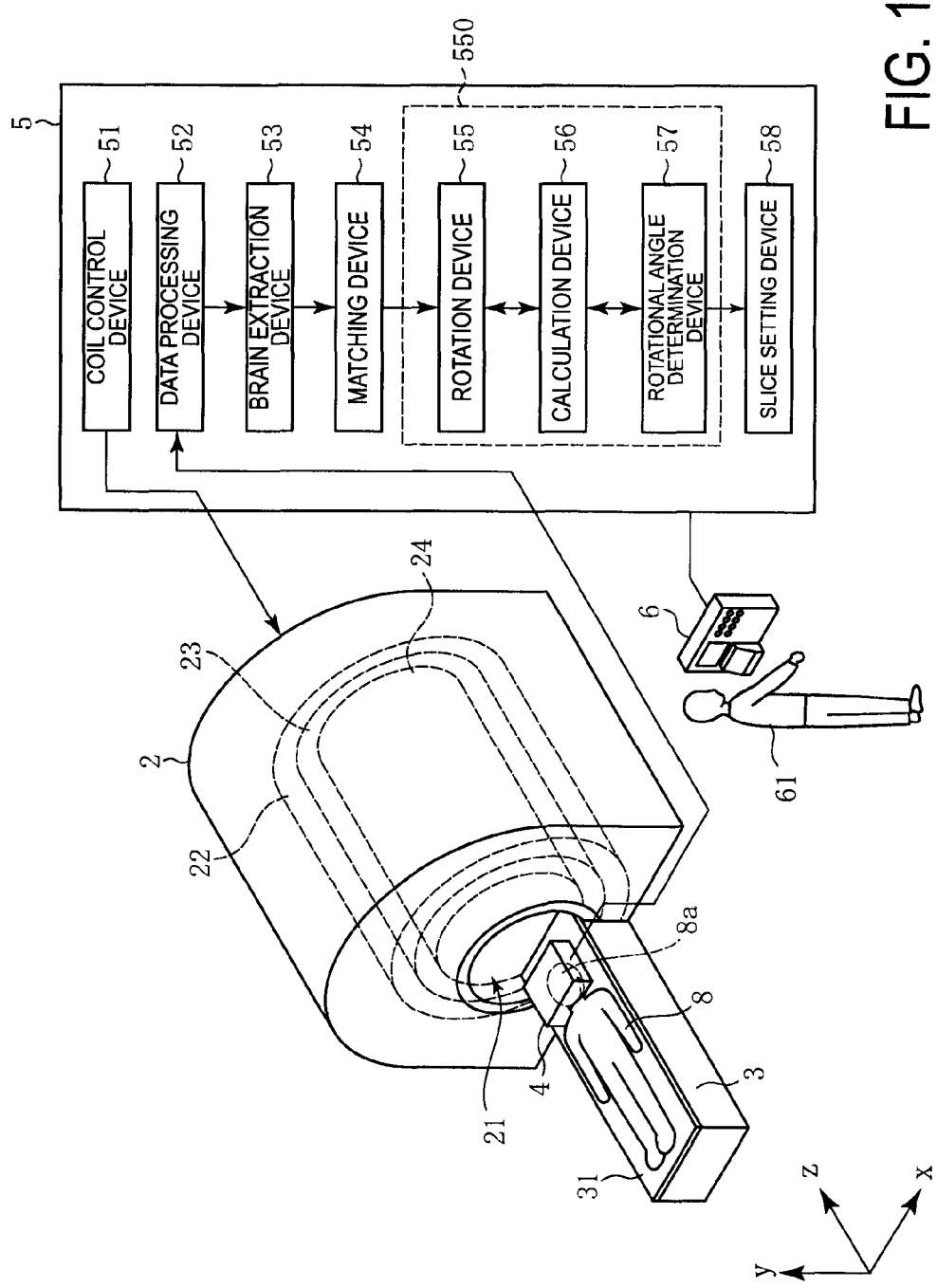
FIG. 1 is a schematic diagram of a magnetic resonance imaging system 1 according to one embodiment of the invention.

FIG. 1 is a schematic diagram of a magnetic resonance imaging system 1 according to one embodiment of the invention.

The magnetic resonance imaging system (hereinafter called "MRI (Magnetic Resonance Imaging)" system) 1 has a coil assembly 2, a table 3, a reception coil 4, a controller 5 and an input device 6.

The coil assembly 2 has a bore 21 in which a subject 8 is held, a superconductive coil 22, a gradient coil 23 and a transmission coil 24. The superconductive coil 22 forms a static magnetic field B0, the gradient coil 23 applies a gradient pulse and the transmission coil 24 transmits an RF pulse.

The table 3 has a cradle 31. The cradle 31 is configured so as to move in a z direction and a −z direction. With the movement of the cradle 31 in the z direction, the subject 8 is conveyed to the bore 21. With the movement of the cradle 31 in the −z direction, the subject 8 conveyed to the bore 21 is carried out of the bore 21.

The reception coil 4 is attached to the head 8a of the subject 8. An MR (Magnetic Resonance) signal received by the reception coil 4 is transmitted to the controller 5.

The controller 5 has a coil control device 51 through a slice setting device 58.

The coil control device 51 controls the gradient coil 23 and the transmission coil 24 in such a manner that a pulse sequence for imaging the subject 8 is executed.

The data processing device 52 processes data acquired by the reception coil 4 and reconstructs volume data DV (see FIG. 3) of the head 8a of the subject 8.

The brain extraction device 53 extracts a brain 8b (see FIG. 5) from the volume data DV.

The matching device 54 matches the sample brain 8b with a standard brain T (see FIGS. 7A-7C and 8A-8C).

The median plane determination device 550 determines a median plane. The median plane determination device 550 has a rotation device 55, a calculation device 56 and a rotational angle determination device 57 to determine the median plane. The rotation device 55 rotates a YZ plane in such a manner that rotational angles Φxy and Φzx of the YZ plane are changed (see, for example, FIGS. 12A-12C and 18A-18C). The calculation device 56 calculates integral values A and B of voxel values of voxels that intersect with the YZ plane, each time the rotational angles Φxy and Φzx are changed (see, for example, FIGS. 14 and 20). The rotational angle determination device 57 determines the rotational angle Φxy when the integral value A is minimized, and the rotational angle Φzx when the integral value B is minimized. The median plane determination device 550 is implemented by installing programs for executing the operations of the rotation device 55, a calculation device 56 and a rotational angle determination device 57 in the controller 5. It may however be realized only by hardware without using the programs.

The slice setting device 58 sets each slice, based on the median plane determined by the median plane determination device 550.

The input device 6 inputs various instructions or the like to the controller 5 in response to the operations of an operator 61.

The MRI system 1 is configured in the above-described manner. One example of a processing flow of the MIR system 1 where the head 8a of the subject 8 is imaged, will next be explained.

Figure 2:
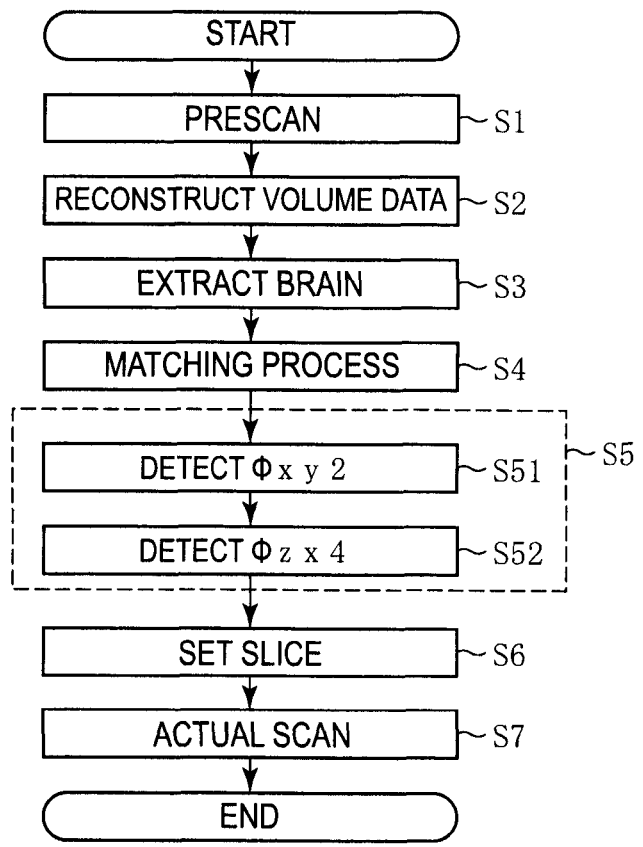
FIG. 2 is a diagram showing one example of a processing flow of the MRI system 1.

FIG. 2 is a diagram showing one example of the processing flow of the MRI system 1.

One example of a flow when each slice is automatically set to the head 8a of the subject 8, based on slice positioning data acquired from the head 8a of the subject 8, and the head 8a of the subject 8 is imaged in accordance with each automatically-set slice, is shown in FIG. 2. The flow of FIG. 2 will be explained below.

At Step S1, slice positioning data necessary to automatically set each slice are acquired. In order to acquire the slice positioning data, the operator 61 operates the input device 6 (see FIG. 1) to input an instruction for collecting the slice positioning data. When this instruction is inputted, the coil control device 51 (see FIG. 1) controls the gradient coil 23 and the transmission coil 24 in such a manner that a prescan for acquiring the slice positioning data is executed. With the execution of the prescan, the reception coil 4 receives an MR signal from the head 8a of the subject 8. The MR signal received by the reception coil 4 is transmitted to the data processing device 52 of the controller 5. After the prescan has been carried out, the processing flow proceeds to Step S2.

At Step S2, the data processing device 52 (see FIG. 1) reconstructs the volume data of the head 8a of the subject 8 from the data acquired from the head 8a of the subject 8.

Figure 3:
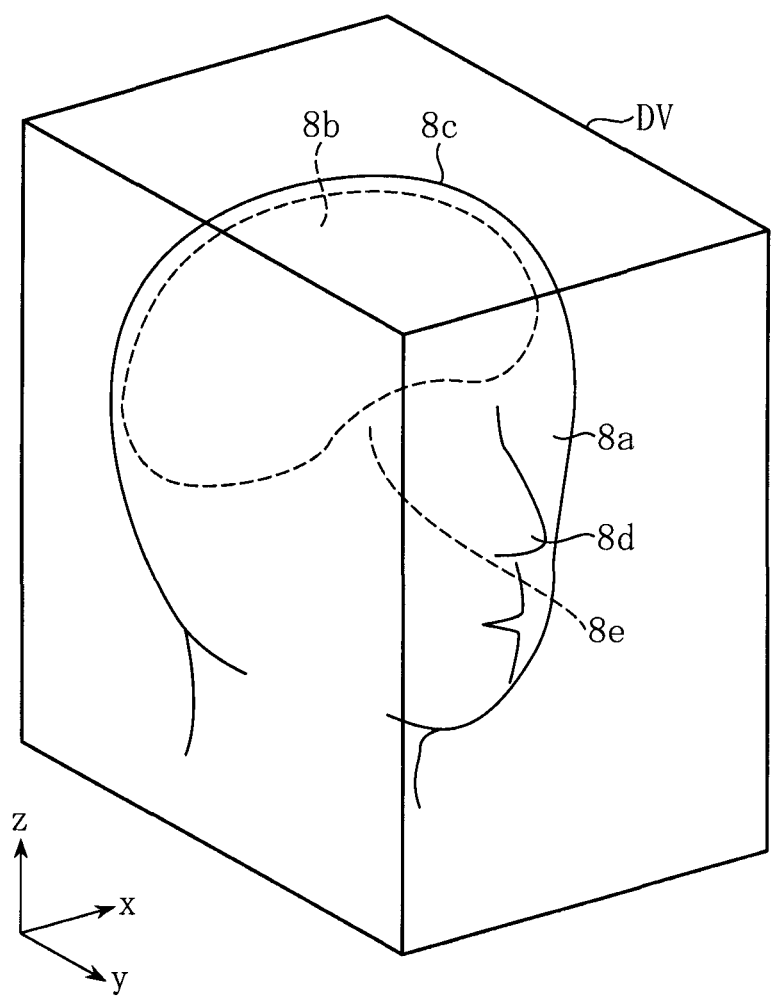
FIG. 3 is a diagram schematically illustrating reconstructed volume data DV.
Figure 4:
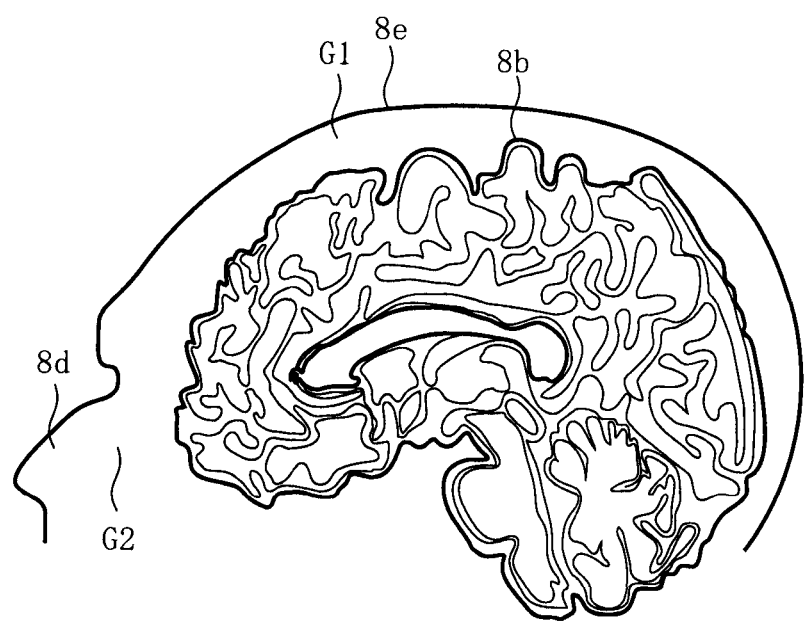
FIG. 4 is a diagram schematically showing one example of a sagittal section of the volume data DV.

FIG. 3 is a diagram schematically showing the reconstructed volume data DV, and FIG. 4 is a diagram schematically showing one example of a sagittal section of the volume data DV.

As shown in FIG. 3, the reconstructed volume data DV represents the head 8a of the subject 8. Data about the brain 8b, etc. are contained in the volume data DV. After the reconstruction of the volume data DV, the processing flow proceeds to Step S3.

At Step S3, the brain extraction device 53 (see FIG. 1) extracts the brain 8b from the volume data DV. Since a process for matching the brain 8b of the subject 8 to the standard brain is performed at a matching process to be described later (see Step S4 of FIG. 2) in the present embodiment, the process of extracting the brain 8b from the volume data DV is performed at Step S3 as its preprocessing. The brain extraction device 53 extracts the brain 8b from the volume data DV using a gap G1 defined between the brain 8b and its scalp 8e, a gap G2 defined between the brain 8b and a nasal cavity 8d (see FIG. 4), etc. As an extracting method, Erosion, Dilation, etc. can be applied.

Figure 5:
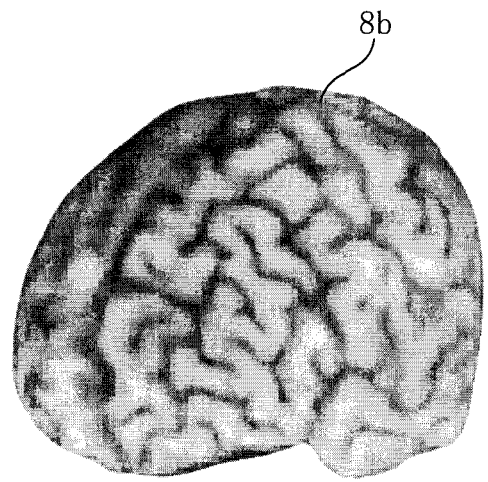
FIG. 5 is a perspective view illustrating a three-dimensional image of an extracted brain 8b.

FIG. 5 is a perspective view showing a three-dimensional image of the extracted brain 8b.

It is understood from FIG. 5 that only the brain 8b has been extracted. After the brain 8b has been extracted, the processing flow proceeds to Step S4.

At Step S4, the process of matching the extracted brain (hereinafter called "sample brain") 8b to the standard brain is performed.

Figure 6:
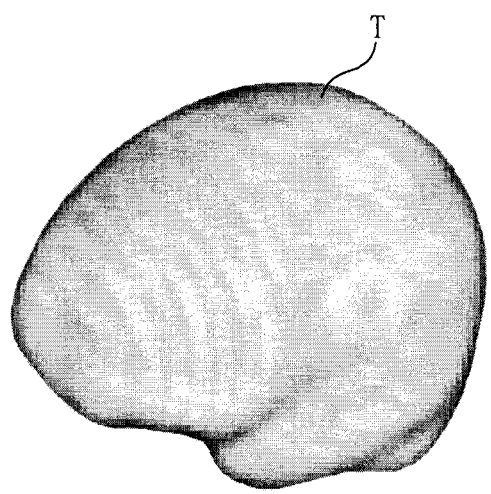
FIG. 6 is a perspective view showing one example of a three-dimensional image of a standard brain.

FIG. 6 is a perspective view showing one example of a three-dimensional image of the standard brain.

In the present embodiment, the sample brain 8b is matched to the standard brain T using three-dimensional Affine transformation. The matching is done by using the following parameters upon the three-dimensional Affine transformation.

(1) Three transfer parameters tx, ty and tz,
(2) Three angle (rotation) parameters rx, ry and rx, and
(3) Three scaling parameters sx, sy and sz.

The center of gravity of the sample brain 8b is first matched to that of the standard brain thereby to determine the transfer parameters tx, ty and tz.

Figure 7A:
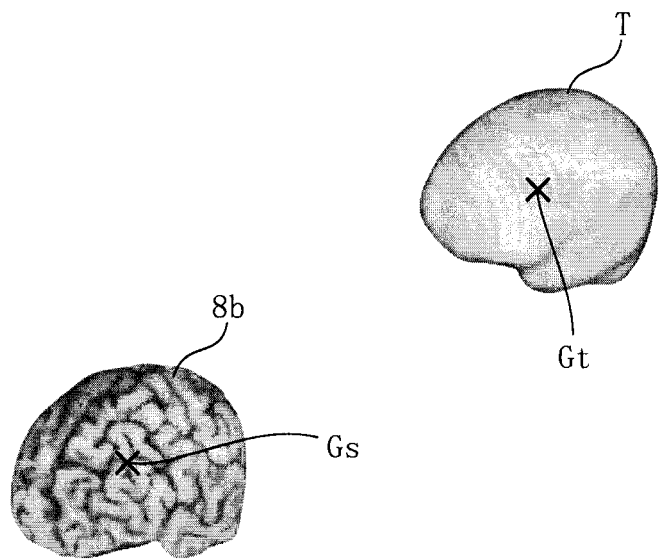
FIG. 7A is a diagram showing the manner of a sample brain 8b prior to the center of gravity of the sample brain 8b being matched to the center of gravity of the standard brain.
Figure 7B:
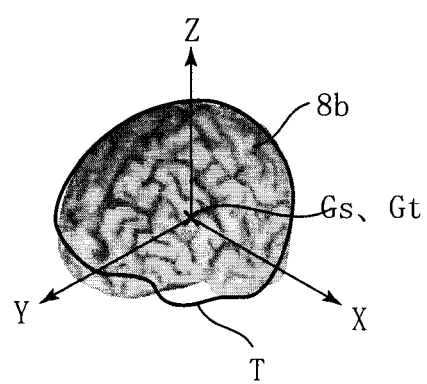
FIG. 7B is a diagram showing the manner of the sample brain 8b subsequent to the center of gravity thereof being matched to the center of gravity of the standard brain.

FIG. 7A is a diagram showing the manner of the sample brain 8b before its center of gravity is matched to the center of gravity of the standard brain, and FIG. 7B is a diagram showing the manner of the sample brain 8b after its center of gravity has been matched to the center of gravity of the standard brain, respectively.

The matching device 54 (see FIG. 1) determines the center of gravity Gs of the sample brain 8b and the center of gravity Gt of the standard brain T (see FIG. 7A). After the center of gravity Gs thereof and the center of gravity Gt thereof have been determined, the values of the transfer parameters tx, ty and tz for matching the center of gravity Gs of the sample brain 8b to the center of gravity Gt of the standard brain T are determined. Thus, the center of gravity Gs of the sample brain 8b can be matched to the center of gravity Gt of the standard brain T as shown in FIG. 7B. Incidentally, only the contour of the standard brain T is shown in FIG. 7B.

After the transfer parameters tx, ty and tz have been determined, the three angle (rotation) parameters rx, ry and rz and the three scaling parameters sx, sy and sz are optimized.

FIG. 8A is a diagram showing the manner of the three angle (rotation) parameters rx, ry and rz and the three scaling parameters sx, sy and sz, prior to their optimization, and FIG. 8B is a diagram showing the manner of the three angle (rotation) parameters rx, ry and rz and the three scaling parameters sx, sy and sz, subsequent to their optimization, respectively.

An axial image, a sagittal image and a coronal image of both the sample brain 8b and the standard brain T prior to their optimization are shown in FIG. 8A. An axial image, a sagittal image and a coronal image of both the sample brain 8b and the standard brain T subsequent to their optimization are shown in FIG. 8B. However, only the contour of the standard brain T is shown in each of FIGS. 8A and 8B.

It is understood that when FIGS. 8A and 8B are compared to each other, the sample brain 8b is matched to the standard brain T by the optimization of the parameters. After the completion of their matching, the processing flow proceeds to Step S5.

At Step S5, a medial plane is determined based on the position of a brain's longitudinal cerebral fissure. In the present embodiment, a sagittal section that passes through the longitudinal cerebral fissure is determined as the median plane. Thus, the longitudinal cerebral fissure must be detected to determine the median plane. How to detect the longitudinal cerebral fissure will be explained below in the present embodiment.

FIGS. 9 through 22 are respectively explanatory diagrams about how to detect the longitudinal cerebral fissure.

FIGS. 9A, 9B, and 9C are diagrams showing one example of positions of the sample brain 8b subsequent to the execution of the matching process (Step S4) in an XYZ space thereof (the standard brain T is omitted from the figure for convenience of explanation). FIG. 9A is a perspective view of the sample brain 8b, and FIGS. 9B and 9C are respectively diagrams showing an axial section (section in XY plane) and a coronal section (section in ZX plane) of the sample brain 8b.

An example in which the longitudinal cerebral fissure 8c is located within a YZ plane is shown in FIGS. 9B and 9C. By executing the matching process (Step S4), the YZ plane coincides with the median plane where the longitudinal cerebral fissure 8c is placed within the YZ plane. Accordingly, the YZ plane may be used as the median plane. Since there are however differences between individuals in the shape of the sample brain 8b, the longitudinal cerebral fissure 8c of the sample brain 8b is not necessarily located within the YZ plane even if the matching process is done, but might be shifted from the YZ plane (see FIGS. 10A, 10B, and 10C).

FIGS. 10A, 10B, and 10C are diagrams showing one example where the longitudinal cerebral fissure 8c of the sample brain 8b is shifted from the YZ plane.

FIG. 10A is a perspective view of the sample brain 8b, and FIGS. 10B and 10C are respectively diagrams showing an axial section (section in XY plane) and a coronal section (section in ZX plane) of the sample brain 8b.

As shown in FIGS. 10B and 10C, the YZ plane is slightly shifted from the longitudinal cerebral fissure 8c. Since each slice is set based on the median plane at Step S6 to be described later in the present embodiment, the slice cannot be set to a desired position where the YZ plane shifted from the longitudinal cerebral fissure 8c is determined as the median plane as it is. Thus, in order to set each slice to the desired position, there is a need to determine the position of the longitudinal cerebral fissure 8c as accurate as possible. Therefore, in the present embodiment, the position of the longitudinal cerebral fissure 8c is determined in the above-described manner.

The longitudinal cerebral fissure 8c corresponds to a groove-like portion defined between the left brain of the brain and the right brain thereof. When the brain is imaged by the MRI system, the intensity of an MR signal at the longitudinal cerebral fissure 8c and the intensity of an MR signal at each of tissues (white matter, gray matter, etc.) of the left and right brains differ from each other. The present embodiment is directed to paying attention to the difference in intensity between the MR signals. When the brain is imaged with T1 enhancement, for example, the signal intensity of the longitudinal cerebral fissure 8c become minimum within the signal intensities of the respective portions of the brain. Thus, if it is possible to find out a location where the signal intensity becomes small in the brain, the longitudinal cerebral fissure 8c can be specified. Therefore, in the present embodiment, the location where the signal intensity becomes low is found out within the brain in a manner described below.

FIGS. 11 through 20 are respectively explanatory diagrams for fining out each location where the signal intensity becomes low.

Figure 11:
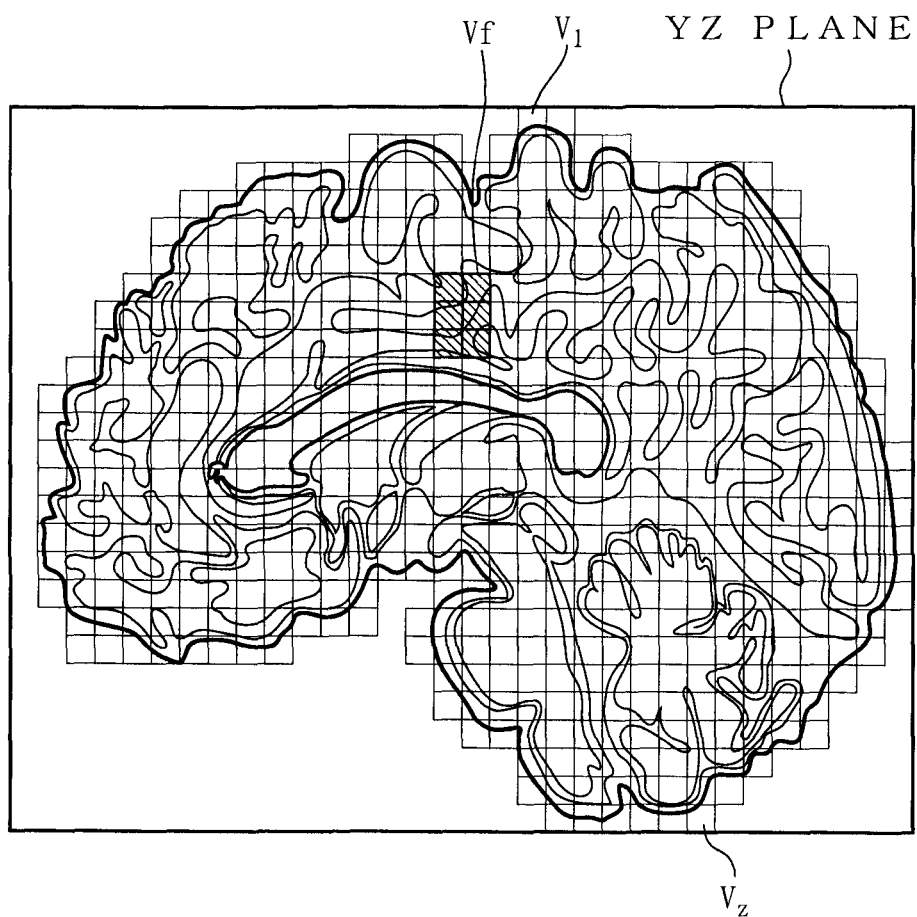
FIG. 11 is a diagram schematically illustrating the YZ plane shown in FIG. 10 and brain's voxels V1 through Vz that intersect with the YZ plane.
Figure 12:
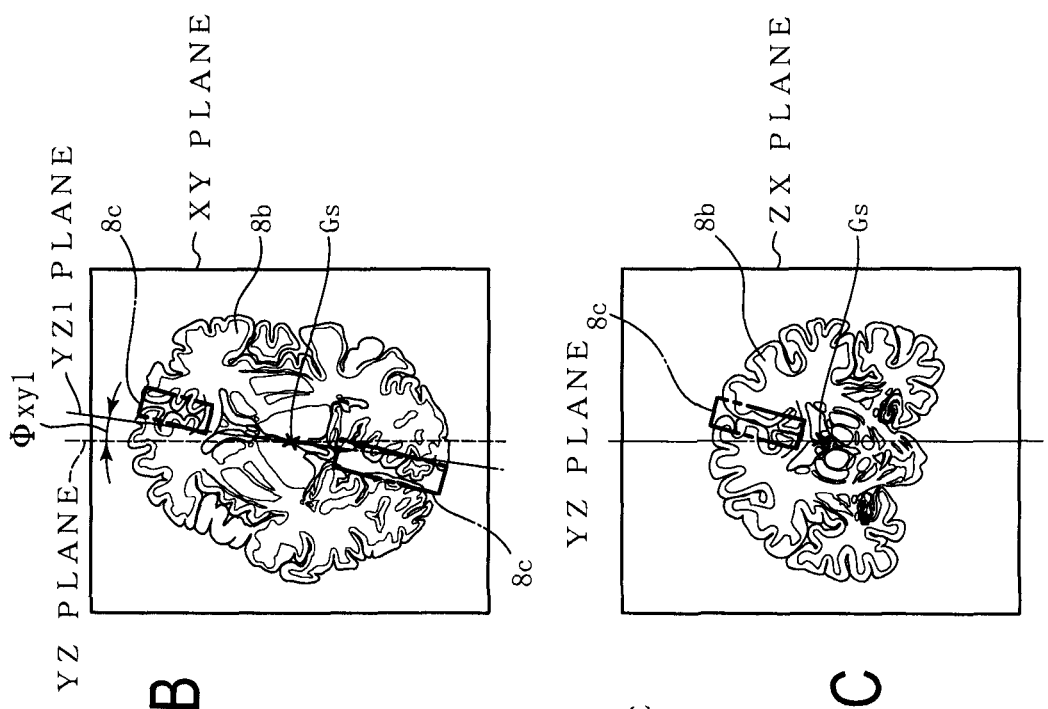
FIGS. 12A, 12B, and 12C are diagrams after the YZ plane has been rotated about a Z axis.

FIG. 11 schematically shows the YZ plane shown in FIG. 10B and brain's voxels V1 through Vz that intersect with the YZ plane. In FIG. 11, each of the voxels V1 through Vz is shown in a square form. Actually, the sizes of the voxels V1 through Vz are much smaller. However, they are represented in a more enlarged form than the size of each actual voxel for convenience of explanation in FIG. 11. Of the voxels V1 through Vz, each voxel Vf including the longitudinal cerebral fissure 8c is shown in diagonal lines (six voxels Vf are shown in diagonal lines in FIG. 11). An integral value A of voxel values of the voxel V1 through Vz that intersect with the YZ plane is first calculated from within all the voxels of the sample brain 8b. After the integrated value A has been calculated, the YZ plane is rotated about its corresponding Z axis.

FIGS. 12A, 12B, and 12C are diagrams after the YZ plane has been rotated about the Z axis.

FIG. 12A is a diagram showing the relationship of position between an XYZ space and a sample brain 8b, and FIGS. 12B and 12C are respectively diagrams showing an axial section (section in XY plane) and a coronal section (section in ZX plane) of the sample brain 8b.

FIGS. 12A, 12B, and 12C show the manner in which the YZ plane is rotated by a rotational angle Φxy=Φxy1 about the Z axis. With the rotation of the YZ plane about the Z axis, the position where the YZ plane cuts across the sample brain 8b can be changed. It is understood that the YZ plane (YZ1 plane) after having been rotated by the rotational angle Φxy1 about the Z axis cuts across a position closer to the longitudinal cerebral fissure 8c than the sample brain 8b within the XY plane as shown in FIG. 12B.

Figure 13:
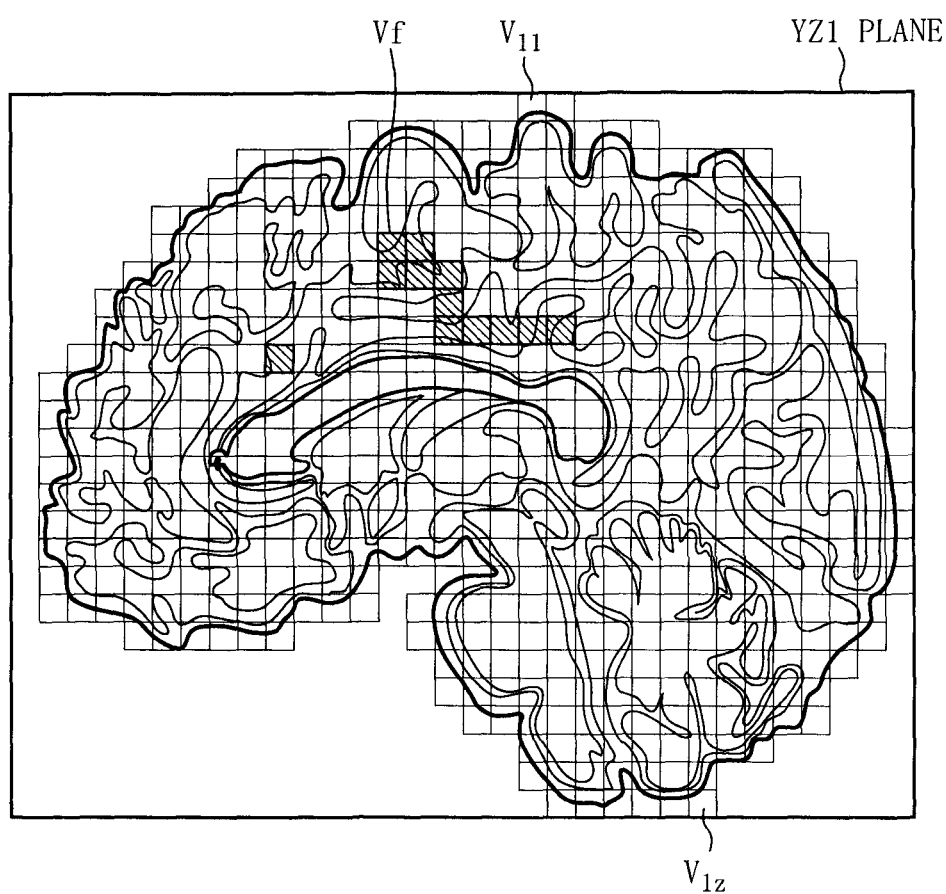
FIG. 13 is a diagram schematically showing a YZ1 plane (see FIG. 12) and brain's voxels V11 through V1z that intersect with the YZ1 plane.

FIG. 13 is a diagram schematically showing the YZ1 plane (see FIGS. 12B and 12C) and brain's voxels V11 through V1z that intersect with the YZ1 plane.

Actually, the sizes of the voxels V11 through V1z are much smaller. However, they are represented in a more enlarged form than the size of each actual voxel for convenience of explanation in FIG. 13. Of the voxels V11 through V1z, the voxels Vf including the longitudinal cerebral fissure 8c are shown in diagonal lines (twelve voxels Vf are shown in diagonal lines in FIG. 13). After the YZ plane has been rotated by a rotational angle Φxy1 about the Z axis, an integral value A of voxel values of the voxel V11 through V1z that intersect with the YZ1 plane is calculated from within all the voxels of the sample brain 8b.

In a similar manner subsequently, while the rotational angle Φxy is being changed within the XY plane by rotating the YZ plane about the Z axis, an integral value A of voxel values of voxels that intersect with the YZ plane is calculated for every YZ plane different in the rotational angle Φxy.

Figure 14:
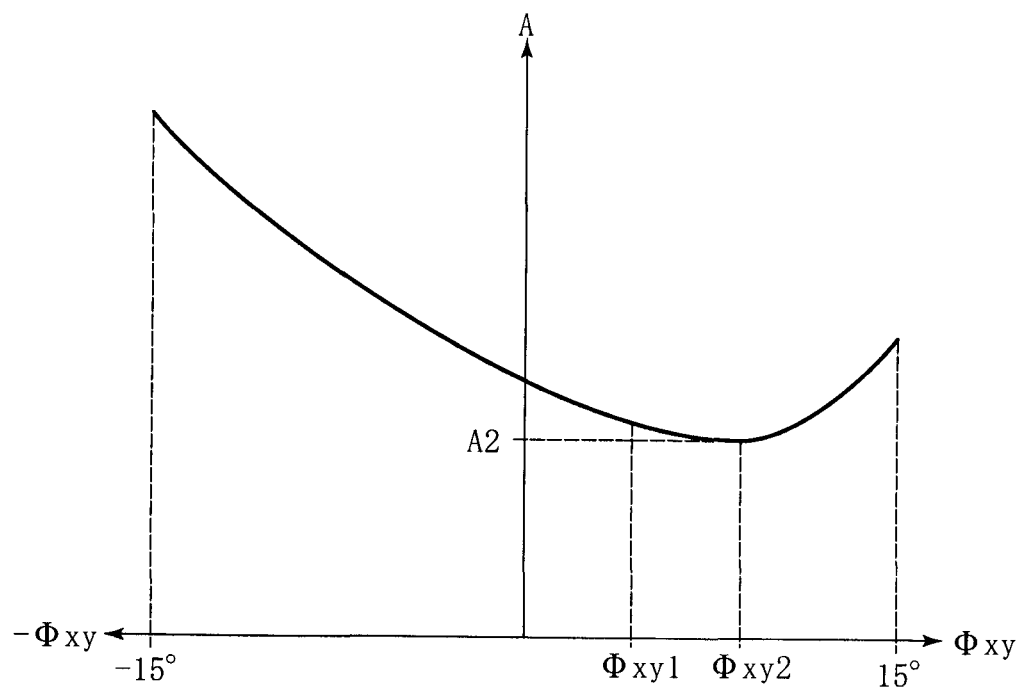
FIG. 14 is a graph illustrating the relationship between a rotational angle Φxy and an integral value A of voxel values of voxels that intersect with the YZ plane.

FIG. 14 is a graph showing the relationship between the rotational angle Φxy and the integral value A of the voxel values of the voxels that intersect with the YZ plane.

The integral value A relative to the rotational angle Φxy where the rotational angle Φxy is changed in the range of $-15°<Φxy<+15°$ is shown in FIG. 14. It is understood from FIG. 14 that an integral value A2 at Φxy=Φxy2 becomes a minimum value. When the brain is imaged with, for example, T1 enhancement as mentioned above, the voxel value of each voxel Vf at the longitudinal cerebral fissure 8c becomes smaller than the voxel values of voxels at tissues (white matter, gray matter, etc.) of the left and right brains. It is thus understood that the rotational angle Φxy2 at which the integral value A is brought to the minimum value A2 is a rotational angle at which the YZ plane (within XY plane) is brought closest to the longitudinal cerebral fissure 8c (see FIG. 15).

FIGS. 15A, 15B, and 15C are diagrams after the YZ plane has been rotated by a rotational angle Φxy2 about the Z axis.

It is understood that referring to FIG. 15B, the YZ plane (YZ2 plane) after having been rotated by the rotational angle Φxy2 about the Z axis cuts across a position where the sample brain 8b approximately coincides with the longitudinal cerebral fissure 8c within the XY plane.

Figure 16:
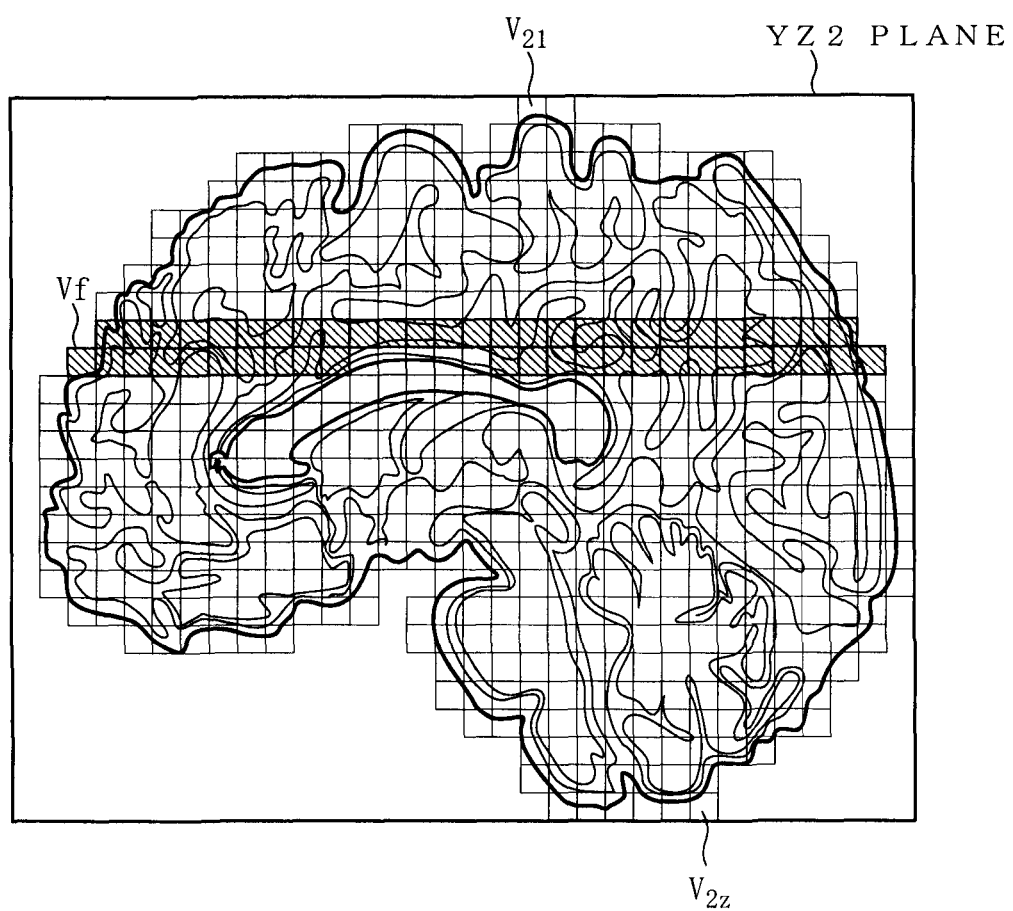
FIG. 16 is a diagram schematically showing a YZ2 plane (see FIG. 15) and brain's voxels V21 through V2z that intersect with the YZ2 plane.

FIG. 16 is a diagram schematically showing the YZ2 plane (see FIG. 15B) and brain's voxels V21 through V2z that intersect with the YZ2 plane.

Actually, the sizes of the voxels V21 through V2z are much smaller. However, they are represented in a more enlarged form than the size of each actual voxel for convenience of explanation in FIG. 16. Of the voxels V21 through V2z, the voxels Vf including the longitudinal cerebral fissure 8c are shown in diagonal lines. It is understood that when FIGS. 16 and 13 are compared with each other, the number of the voxels Vf including the longitudinal cerebral fissure 8c increases by rotating the sample brain 8b by the rotational angle Φxy2.

In FIGS. 11 through 16, however, the integral value A is calculated by changing only the rotational angle Φxy lying within the XY plane. Thus, although the position of the longitudinal cerebral fissure 8c in the XY plane is detected (see FIG. 15B), the position of the longitudinal cerebral fissure 8c in the ZX plane is not yet detected (see FIG. 15C). Therefore, the following process is executed to detect the position of the longitudinal cerebral fissure 8c in the ZX plane.

Figure 17B:
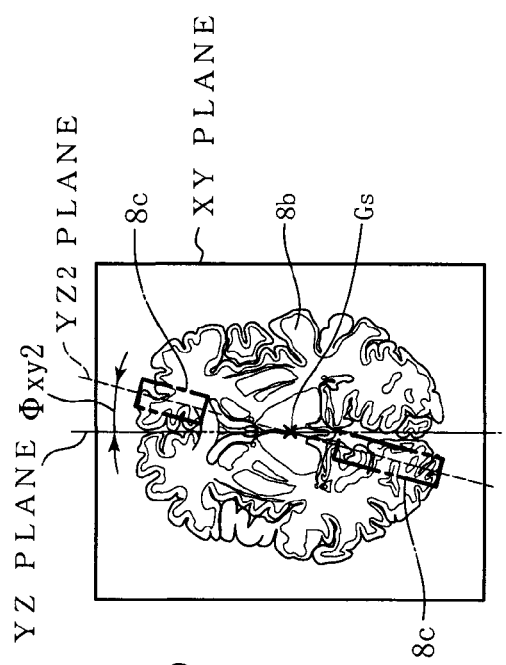
FIGS. 17A, 17B, and 17C are diagrams illustrating a sample brain 8b after it has been rotated counterclockwise by Φxy2 about the Z axis.
Figure 17C:
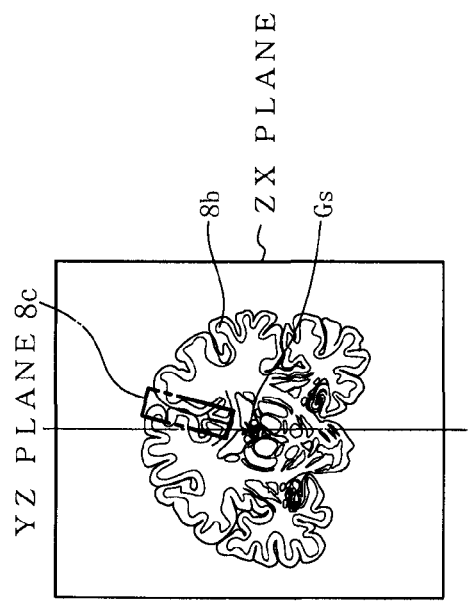
Figure 17A:
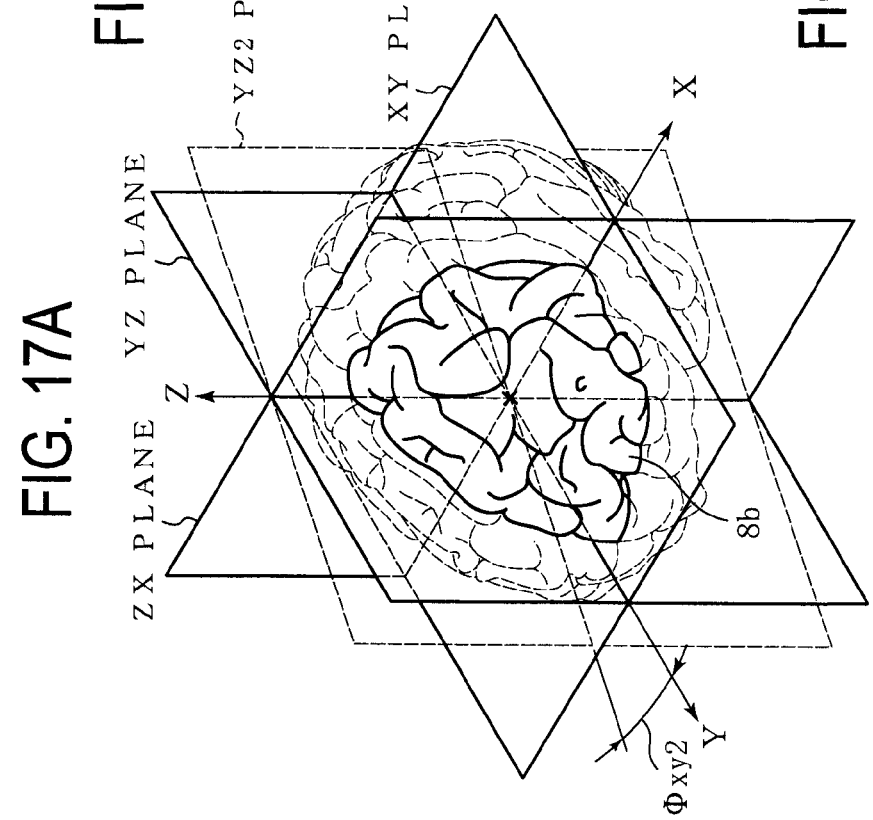

The sample brain 8b is rotated counterclockwise by Φxy2 about the Z axis from the state of FIG. 15B (see FIGS. 17A, 17B, and 17C).

FIGS. 17A, 17B, and 17C are diagrams_showing the sample brain 8b after having been rotated counterclockwise by Φxy2 about the Z axis.

FIG. 17A is a diagram showing the relationship of position between the XYZ plane and the sample brain 8b, and FIGS. 17B and 17C are respectively diagrams showing an axial section (section in XY plane) of the sample brain 8b and its coronal section (section in ZX plane).

It is understood that before the sample brain 8b is rotated by Φxy2, the longitudinal cerebral fissure 8c coincides with the YZ2 plane (see FIG. 15B), whereas the longitudinal cerebral fissure 8c lying within the XY plane approximately coincides with the YZ plane as shown in FIG. 17B by rotating the sample brain 8b by Φxy2 about the Z axis. After the sample brain 8b has been rotated by Φxy2, the YZ plane is rotated about the Y axis (see FIGS. 18A, 18B, and 18C).

Figure 18B:
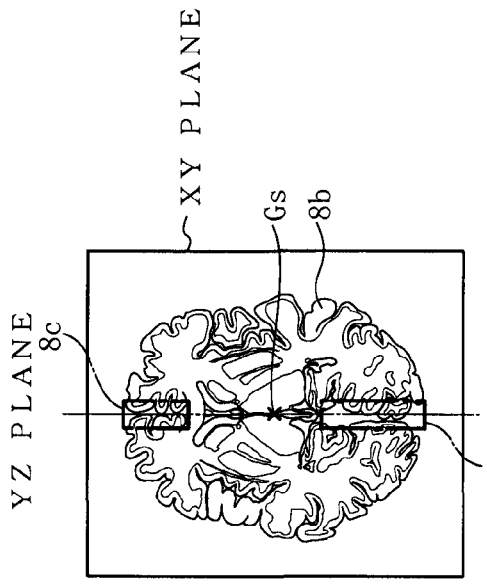
FIGS. 18A, 18B, and 18C are diagrams after the YZ plane has been rotated about a Y axis.
Figure 18C:
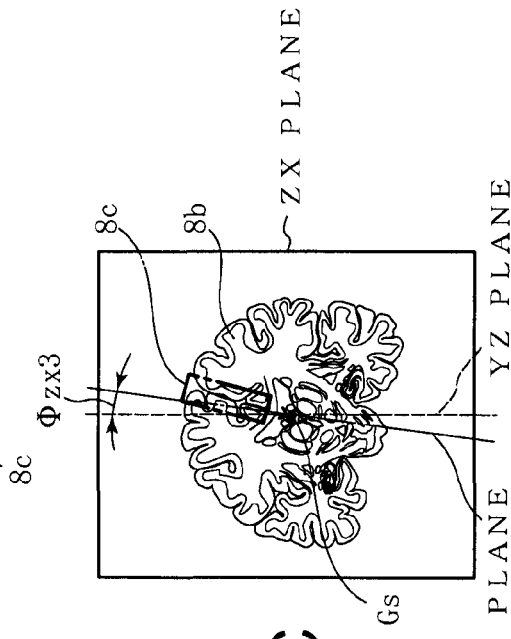
Figure 18A:
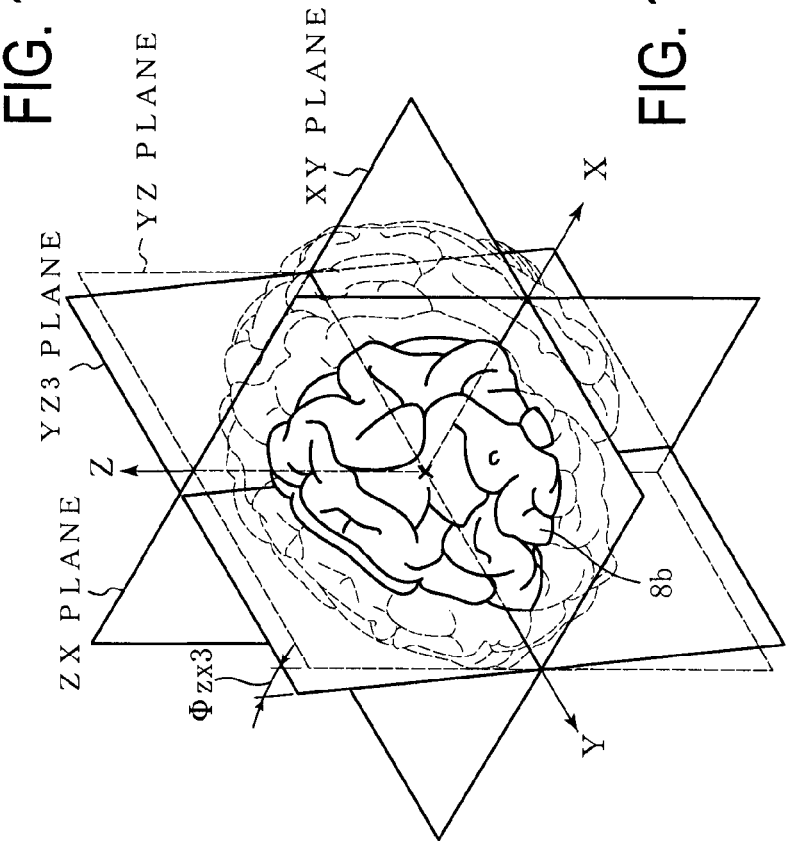

FIGS. 18A, 18B, and 18C are diagrams after the YZ plane has been rotated about the Y axis.

FIG. 18A is a diagram showing the relationship of position between the XYZ plane and the sample brain 8b, and FIGS. 18B and 18C are respectively diagrams showing an axial section (section in XY plane) of the sample brain 8b and its coronal section (section in ZX plane).

FIGS. 18A and 18C show the manner in which the YZ plane is rotated by a rotational angle Φzx=Φzx3 about the Y axis. With the rotation of the YZ plane, the position where the YZ plane cuts across the sample brain 8b can be changed. It is understood that the YZ plane (YZ3 plane) after having been rotated by the rotational angle Φzx3 about the Y axis cuts across a position closer to the longitudinal cerebral fissure 8c than the sample brain 8b within the ZX plane as shown in FIG. 18(c).

Figure 19:
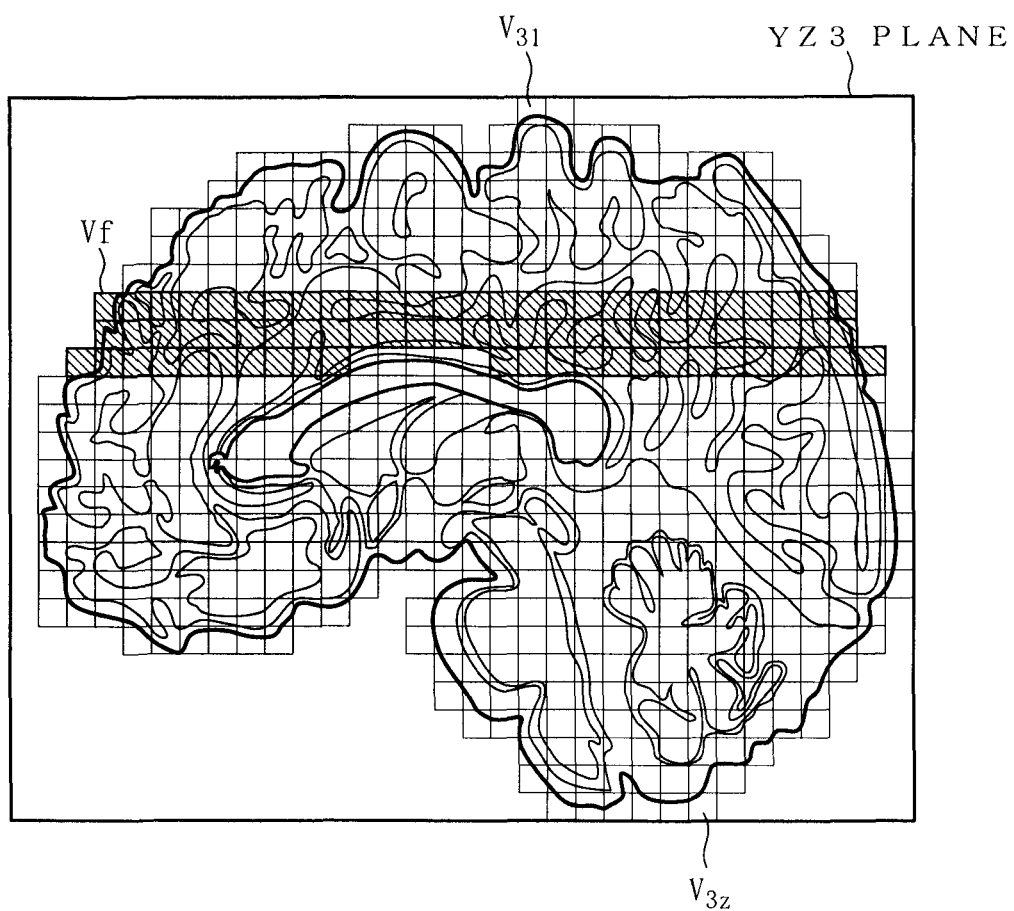
FIG. 19 is a diagram schematically showing a YZ3 plane (see FIG. 18A) and brain's voxels V31 through V3z that intersect with the YZ3 plane.

FIG. 19 is a diagram schematically showing the YZ3 plane (see FIGS. 18A and 18B) and brain's voxels V31 through V3z that intersect with the YZ3 plane.

Actually, the sizes of the voxels V31 through V3z are much smaller. However, they are represented in a more enlarged form than the size of each actual voxel for convenience of explanation in FIG. 19. Of the voxels V31 through V3z, each voxel Vf including the longitudinal cerebral fissure 8c is shown in diagonal lines. After the YZ plane has been rotated by a rotational angle Φzx3 about the Y axis, an integral value B of voxel values of the voxel V31 through V3z that intersect with the YZ3 plane is calculated from within all the voxels of the sample brain 8b.

In a similar manner subsequently, while the rotational angle Φzx is being changed within the ZX plane by rotating the YZ plane about the Y axis, an integral value B of voxel values of voxels that intersect with the YZ plane is calculated for every YZ plane different in the rotational angle Φzx.

Figure 20:
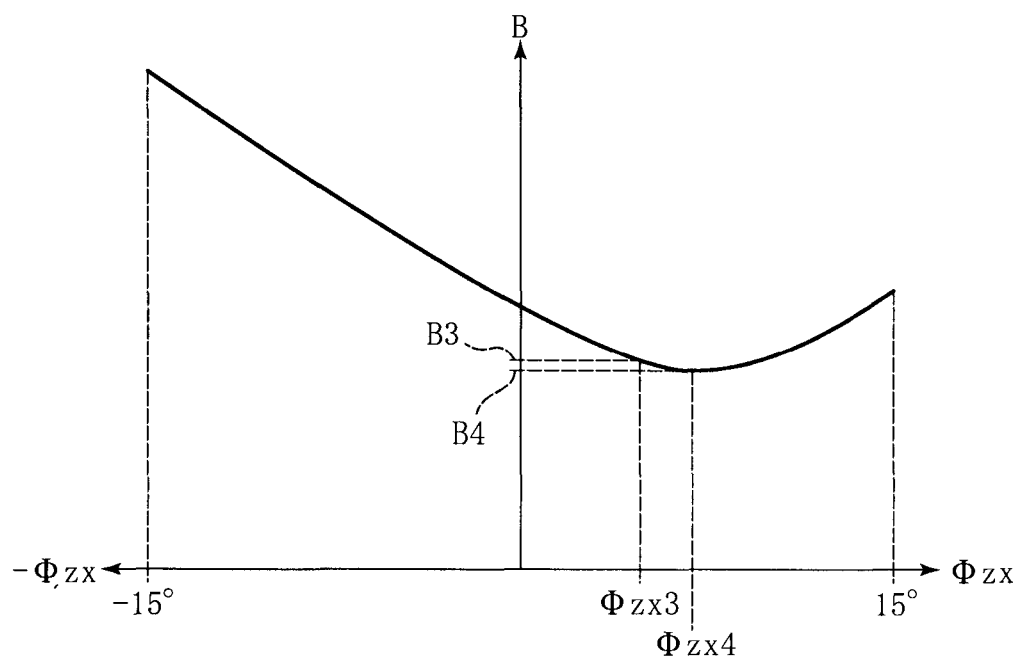
FIG. 20 is a graph showing the relationship between a rotational angle Φzx and an integral value B of voxel values of the voxels that intersect with the YZ plane.

FIG. 20 is a graph showing the relationship between the rotational angle Φzx and the integral value B of the voxel values of the voxels that intersect with the YZ plane.

The integral value B relative to the rotational angle Φzx where the rotational angle Φzx is changed in the range of $-15°<Φzx<+15°$ is shown in FIG. 20. It is understood from FIG. 20 that an integral value B4 at Φzx=Φzx4 becomes a minimum value when compared to an integral value B3 at Φzx=Φzx3. When the brain is imaged with, for example, T1 enhancement as mentioned above, the voxel value of each voxel Vf at the longitudinal cerebral fissure 8c becomes smaller than the voxel values of voxels at tissues (white matter, gray matter, etc.) of the left and right brains. It is thus understood that the rotational angle Φzx4 at which the integral value B is brought to the minimum value B4 is a rotational angle at which the YZ plane (within ZX plane) is brought closest to the longitudinal cerebral fissure 8c (see FIGS. 21A, 21B, and 21C).

FIGS. 21A, 21B, and 21C after the YZ plane has been rotated by the rotational angle Φzx4 about the Y axis.

It is understood that referring to FIG. 21B, the YZ plane (YZ4 plane) after having been rotated by the rotational angle Φzx42 about the Y axis cuts across a position where the sample brain 8b approximately coincides with the longitudinal cerebral fissure 8c within the ZX plane.

Figure 22:
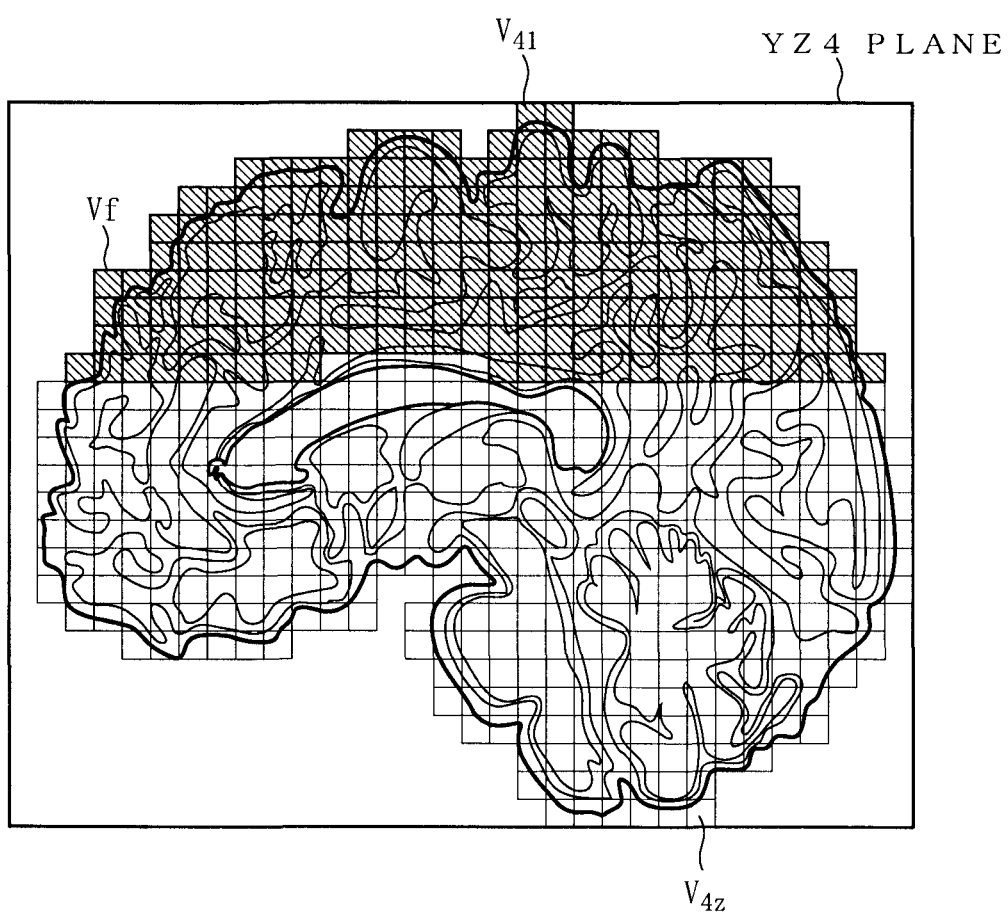
FIG. 22 is a diagram schematically showing a YZ4 plane (see FIG. 21) and brain's voxels V41 through V4z that intersect with the YZ4 plane.

FIG. 22 is a diagram schematically showing the YZ4 plane (see FIGS. 21A and 21C) and brain's voxels V41 through V4z that intersect with the YZ4 plane.

Actually, the sizes of the voxels V41 through V4z are much smaller. However, they are represented in a more enlarged form than the size of each actual voxel for convenience of explanation in FIG. 22. Of the voxels V41 through V4z, the voxels Vf including the longitudinal cerebral fissure 8c are shown in diagonal lines. It is understood that when referring to FIG. 22, the YZ4 plane approximately coincides with the longitudinal cerebral fissure 8c.

As described above while referring to FIGS. 10 through 22, the longitudinal cerebral fissure 8c can be detected by determining the rotational angles Φxy2 and Φzx4. Since the median plane is of a sagittal plane that passes through the longitudinal cerebral fissure 8c, the YZ4 plane (see FIGS. 21A, 21C, and 22) can be decided as the median plane.

Since the median plane is determined based on the procedure described while referring to FIGS. 10 through 22, Step S5 (see FIG. 2) has a Substep S51 for calculating the rotational angle Φxy2 and a Substep S52 for calculating the rotational angle Φzx4.

At Substep S51, the rotation device 55 (see FIG. 1) changes the rotational angle Φxy of the YZ plane in accordance with the procedure described while referring to FIGS. 12 through 16. On the other hand, the calculation device 56 (see FIG. 1) calculates an integral value A for every YZ plane different in rotational angle Φxy. The rotational angle determination device 57 (see FIG. 1) determines the rotational angle Φxy2 (see FIG. 14) at which the integral value A becomes minimum, as the rotational angle for determining the median plane. After the completion of Substep S51, the processing flow proceeds to Substep S52.

At Substep S52, the rotation device 55 changes the rotational angle Φzx of the YZ plane in accordance with the procedure described while referring to FIGS. 18 through 22. On the other hand, the calculation device 56 calculates an integral value B for every YZ plane different in rotational angle Φzx. The rotational angle determination device 57 determines the rotational angle Φzx4 (see FIG. 20) at which the integral value B becomes minimum (integral value B4), as the rotational angle for determining the median plane. Since the rotational angles Φxy2 and Φzx4 have been acquired, the YZ4 plane (see FIGS. 21 and 22) is determined as the median plane as described while referring to FIGS. 9 through 22. After the median plane has been determined, the processing flow proceeds to Step S6.

At Step S6, the slice setting device 58 (see FIG. 1) sets each slice, based on the median plane.

Figure 23:
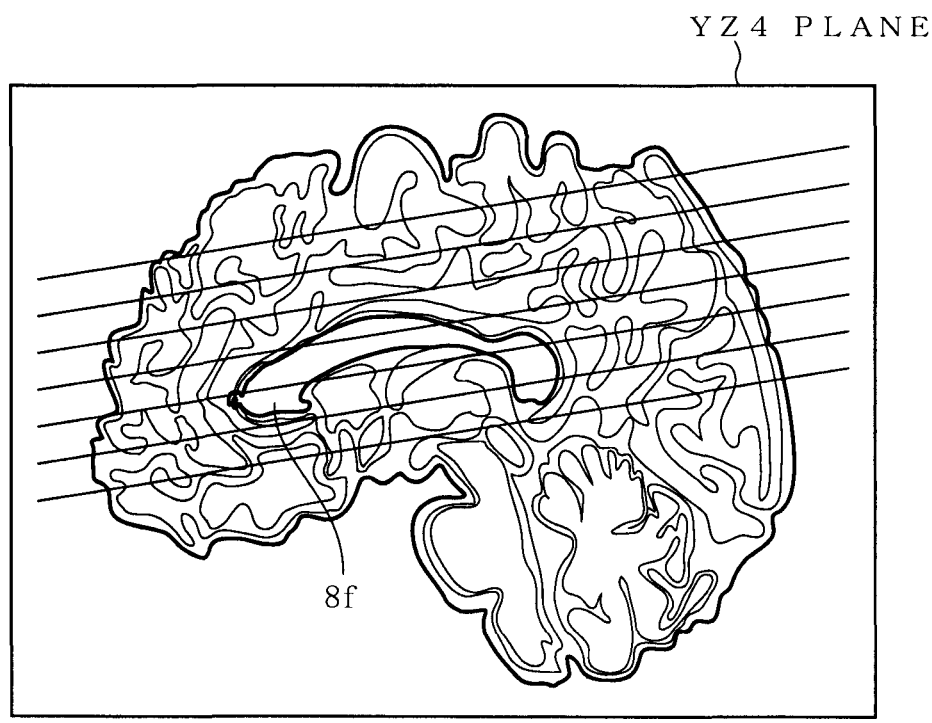
FIG. 23 is one example illustrative of slice positions determined by a slice determination device.

FIG. 23 is one example of each slice determined by the slice setting device 58.

The slice setting device 58 sets each slice based on the median plane (YZ4 plane). Each slice position is determined on the basis of the position of a cerebral ventricle 8f lying within the median plane, for example. After the slices have been set, the processing flow proceeds to Step S7, where an actual scan is executed.

In the present embodiment, the rotational angle Φxy2 at which the YZ plane is brought closest to the longitudinal cerebral fissure 8c within the XY plane, and the rotational angle Φxz4 at which the YZ plane is brought closest to the longitudinal cerebral fissure 8c within the ZX plane, are determined based on the voxel values of the voxels which intersect with the YZ plane that cuts across the sample brain 8b. Thus, since it is possible to detect the position of the longitudinal cerebral fissure 8c in the sample brain 8b with satisfactory accuracy, the median plane can be determined with satisfactory accuracy so as to approximately coincide with the longitudinal cerebral fissure 8c.

In the present embodiment as well, the brain 8b is extracted from the volume data DV (see FIG. 3), and the median plane is determined with respect to the extracted brain 8b. The median plane may however be determined using the volume data DV without extracting the brain 8b from the volume data DV. However, in order to determine the median plane with satisfactory accuracy, the median plane may preferably be determined using data about the brain 8b taken out from the volume data DV without using the volume data DV per se.

In the present embodiment, the median plane (YZ4 plane) that approximately coincides with the longitudinal cerebral fissure 8c is determined by rotating the YZ plane. The median plane may however be determined by rotating the plane (XY plane or the like) other than the YZ plane. Although the two angles Φxy2 and Φzx4 have been determined to decide the median plane in the present embodiment, only either one of them may be determined if the median plane can be decided with satisfactory accuracy. Further, in the present embodiment, the position at which the YZ plane cuts across the brain is changed by rotating the YZ plane, and the median plane is decided based on the rotational angle of the YZ plane. There may however be used, for example, another method such as moving the YZ plane in parallel to thereby change the position at which the YZ plane cuts across the brain and determining the median plane based on a translational distance of the YZ plane.

Although the matching process (Step S4) is provided in the present embodiment, this Step may be omitted. Further, although, in the present embodiment, the median plane is decided (Step S5) and each slice is thereafter set using the decided median plane (Step S6), the median plane needs not to be used for setting each slice but may be used for other purposes other than the setting of each slice.

In present embodiment, the median plane determination device 550 has a rotation device 55, a calculation device 56 and a rotational angle determination device 57 to decide the median plane. The median plane determination device 550 may however be configured using other components if it is possible to decide the median plane.

Incidentally, the YZ4 plane after the YZ plane has been rotated by the rotational angle Φzx4 at the minimum value B4 of the integral value B is decided as the median plane in the present embodiment. When, however, the number of the voxels V31 through V3z that intersect with the YZ3 plane is extremely smaller than the number of the voxels V41 through V4z that intersect with the YZ4 plane, the integral value B3 might be brought to a minimum value. In this case, if the median plane is decided from the rotational angle Φzx at which the integral value B is brought to the minimum value, the YZ3 plane shifted from the longitudinal cerebral fissure 8c is decided as the median plane. Given this situation, the median plane cannot be determined with satisfactory accuracy. In order to avoid such a situation, an average value HB of voxel values is calculated instead of the integral value B of the voxel values, and a rotational angle Φzx when the average value HB is brought to a minimum value, may be adopted as the rotational angle upon determination of the median plane. The average value HB of the voxel values can be expressed in the following equation (1) using the integral value B:

$$HB = B/N \quad (1)$$

where N: the number of voxels that intersect with YZ plane after having been rotated by rotational angle Φzx.

Since the average value HB of the voxel values is a value obtained by dividing the integral value B by the number of voxels N, the average value HB thereof indicates an average value of voxel values of N voxels that intersect with the YZ plane. It means that the smaller the average value HB, the more the ratio of the number of the voxels Vf (refer to FIG. 22, for example) including the longitudinal cerebral fissure 8*c* to the number of voxels N increases. Thus, even though the rotational angle Φzx when the average value HB becomes minimum is determined, the longitudinal cerebral fissure 8*c* can be detected. Generally, when the range of changing the rotational angle Φzx is narrow, the longitudinal cerebral fissure 8*c* can be detected with satisfactory accuracy even if both of the integral value B and the average value HB are used, whereas when the range of changing the rotational angle Φzx is wide, the longitudinal cerebral fissure 8*c* can be detected with more satisfactory accuracy where the average value HB rather than the integral value B is used. When, for example, the rotational angle Φzx is changed within the range of −15°<Φzx<15° as in the present embodiment, the longitudinal cerebral fissure 8*c* can be detected with satisfactory accuracy even where both of the integral value B and the average value HB are used. When it is however desired to change the rotational angle Φzx over a wider range (for example, −45°<Φzx<45°), the average value HB rather than the integral value B may preferably be used because the longitudinal cerebral fissure 8*c* can be detected with more satisfactory accuracy. Although the rotational angle Φzx has been explained in the above description, the rotational angle Φxy is also similar to the above. Incidentally, the rotational angle may be determined using another value other than the integral value and the average value.

Many widely different embodiments of the invention may be configured without departing from the spirit and the scope of the present invention. It should be understood that the present invention is not limited to the specific embodiments described in the specification, except as defined in the appended claims.

What is claimed is:

1. A median plane determination apparatus configured to determine a median plane based on volume data of a three-dimensional image of a brain of a subject, the median plane determination apparatus comprising a processor programmed to determine the median plane, located within the yz plane, based on calculated voxel values of a plurality of voxels that intersect a reference plane cutting across the brain within the yz plane, wherein the voxel values of the plurality of voxels which intersect with the reference plane are calculated while changing a position where the reference plane cuts across the brain such that at least one of the rotational angles Φxy and Φzx of the reference plane in the yz plane is changed.

2. The median plane determination apparatus according to claim 1, wherein one of an integral value of the voxel values of the plurality of voxels and an average value of the voxel values of the plurality of voxels is calculated while changing the position where the reference plane cuts across the brain, and the median plane is determined based on the integral value or the average value.

3. The median plane determination apparatus according to claim 1, wherein the median plane determination apparatus comprises:

a rotation device configured to rotate the reference plane such that the at least one of rotational angles Φxy and Φzx of the reference plane is changed;
a calculation device configured to calculate the voxel values of the plurality of voxels intersecting with the reference plane for every reference plane different in the at least one of rotational angles Φxy and Φzx; and
a rotational angle determination device configured to determine a rotational angle for determining the median plane from within rotational angles of the reference plane, based on the voxel values calculated by the calculation device.

4. The median plane determination apparatus according to claim 1, wherein the median plane determination apparatus comprises:

a rotation device configured to rotate the reference plane such that the at least one of rotational angles Φxy and Φzx of the reference plane is changed;
a calculation device configured to calculate the voxel values of the plurality of voxels intersecting with the reference plane for every reference plane different in the at least one of rotational angles Φxy and Φzx; and
a rotational angle determination device configured to determine a rotational angle for determining the median plane from within rotational angles of the reference plane, based on the voxel values calculated by the calculation device.

5. The median plane determination apparatus according to claim 2, wherein the median plane determination apparatus comprises:

a rotation device configured to rotate the reference plane such that the at least one of rotational angles Φxy and Φzx of the reference plane is changed;
a calculation device configured to calculate the voxel values of the plurality of voxels intersecting with the reference plane for every reference plane different in the at least one of rotational angles Φxy and Φzx; and
a rotational angle determination device configured to determine a rotational angle for determining the median plane from within rotational angles of the reference plane, based on the voxel values calculated by the calculation device.

6. The median plane determination apparatus according to claim 3, wherein
the calculation device is configured to calculate the voxel values of the plurality of voxels for every reference plane different in the at least one of rotational angles Φxy and Φzx within the yz plane.

7. The median plane determination apparatus according to claim 6, wherein the calculation device is configured to calculate one of an integral value of the voxel values of the plurality of voxels and an average value of the voxel values of the plurality of voxels for every reference plane different in the at least one of rotational angles Φxy and Φzx within the yz plane.

8. The median plane determination apparatus according to claim 7, wherein the rotational angle determination device is configured to determine the at least one of rotational angles Φxy and Φzx at which the integral value or the average value becomes minimum, as a rotational angle for determining the median plane.

9. The median plane determination apparatus according to claim 7, wherein the rotational angle determination device is configured to determine, as rotational angles for determining the median plane, a Φxy rotational angle at which the integral value or the average value becomes minimum, and a Φzx rotational angle at which the integral value or the average value becomes minimum.

10. The median plane determination apparatus according to claim 1, wherein the median plane determination apparatus comprises an extraction device configured to extract the brain from volume data of a head of the subject; and
a center-of-gravity calculation device configured to calculate a center of gravity of the extracted brain.

11. The median plane determination apparatus according to claim 10, wherein the reference plane passes through the center of gravity of the brain.

12. A magnetic resonance imaging system comprising:
a reception coil configured to receive a magnetic resonance signal emitted by a coil assembly; and
a median plane determination apparatus comprising a processor programmed to determine a median plane based on volume data of a three-dimensional image of a brain of a subject, wherein the median plane, located within the yz plane, is determined based on calculated voxel values of a plurality of voxels that intersect a reference plane cutting across the brain within the yz plane, and wherein the voxel values of the plurality of voxels which intersect with the reference plane are calculated while changing a position where the reference plane cuts across the brain such that at least one of the rotational angles Φxy and Φzx of the reference plane in the yz plane is changed.

13. One or more non-transitory computer-readable media comprising a program for instructing a processor to determine a median plane based on volume data of a three-dimensional image of a brain of a subject to function in such a manner that the median plane determination apparatus determines the median plane, based on calculated voxel values of voxels intersecting with a reference plane which cuts across the brain within the yz plane, and wherein the voxel values of the plurality of voxels which intersect with the reference plane are calculated while changing a position where the reference plane cuts across the brain such that at least one of the rotational angles Φxy and Φzx of the reference plane in the yz plane is changed.

* * * * *